United States Patent [19]

Declercq

[11] E Re. 30,089

[45] Reissued Sep. 4, 1979

[54] SELF-TAILING WINCH

[76] Inventor: Maurice G. Declercq, 7144 S. Shore Dr., St. Petersburg, Fla. 33707

[21] Appl. No.: 933,968

[22] Filed: Aug. 15, 1978

Related U.S. Patent Documents

Reissue of:

[64] Patent No.: 4,026,525
Issued: May 31, 1977
Appl. No.: 571,369
Filed: Apr. 24, 1975

[51] Int. Cl.[2] ..... B66D 1/30

[52] U.S. Cl. ..... 254/150 R; 254/175.7; 114/218

[58] Field of Search ..... 254/150 R, 138, 175.7, 254/175.3, 186 R; 114/218; 226/90; 242/47.03

[56] References Cited

U.S. PATENT DOCUMENTS

| | | | |
|---|---|---|---|
| 3,300,187 | 1/1967 | Saxe et al. | 254/175.7 |
| 3,305,218 | 2/1967 | Bjorshol | 254/150 R |
| 3,520,515 | 7/1970 | Pomagalski et al. | 254/150 R |
| 3,717,325 | 2/1973 | Peterson | 254/175.7 |
| 3,770,244 | 11/1973 | McCloud | 254/150 R |
| 3,776,517 | 12/1973 | Davis | 254/150 R |
| 3,841,606 | 10/1974 | Declercq | 254/150 R |

*Primary Examiner*—Robert J. Spar
*Assistant Examiner*—Kenneth Noland
*Attorney, Agent, or Firm*—Shanley, O'Neil and Baker

[57] ABSTRACT

A self-tailing winch assembly that is either combined with the winch drum or which forms a removable apparatus for use therewith that is adapted for controlling the line extending from an object to be pulled by rotation of the winch drum in the normal manner causing the line to be grasped by one or more rollers thereby pulling the line away from the winch.

22 Claims, 19 Drawing Figures

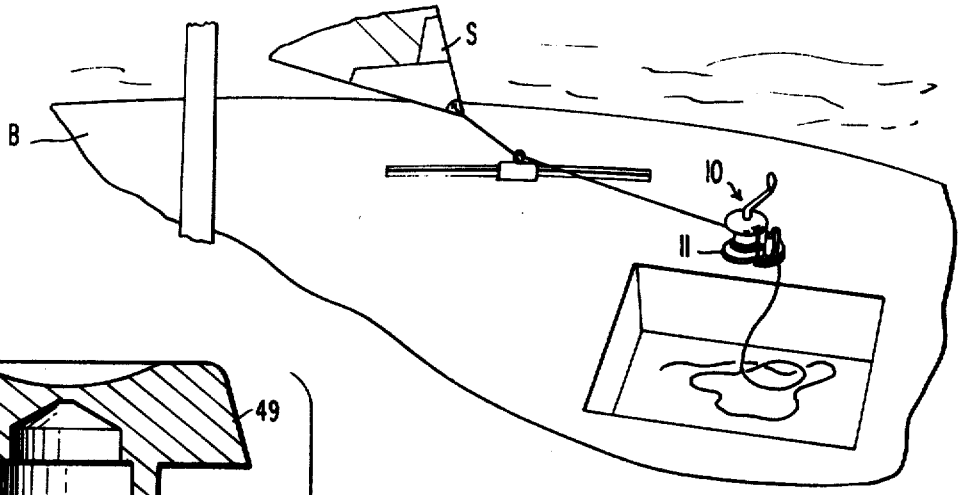
FIG. 1
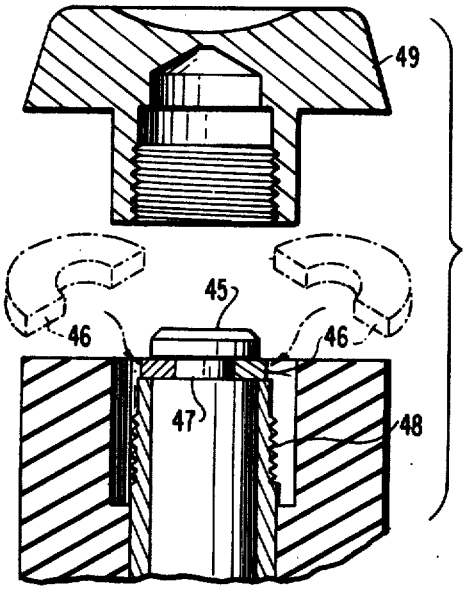
FIG. 3
FIG. 5
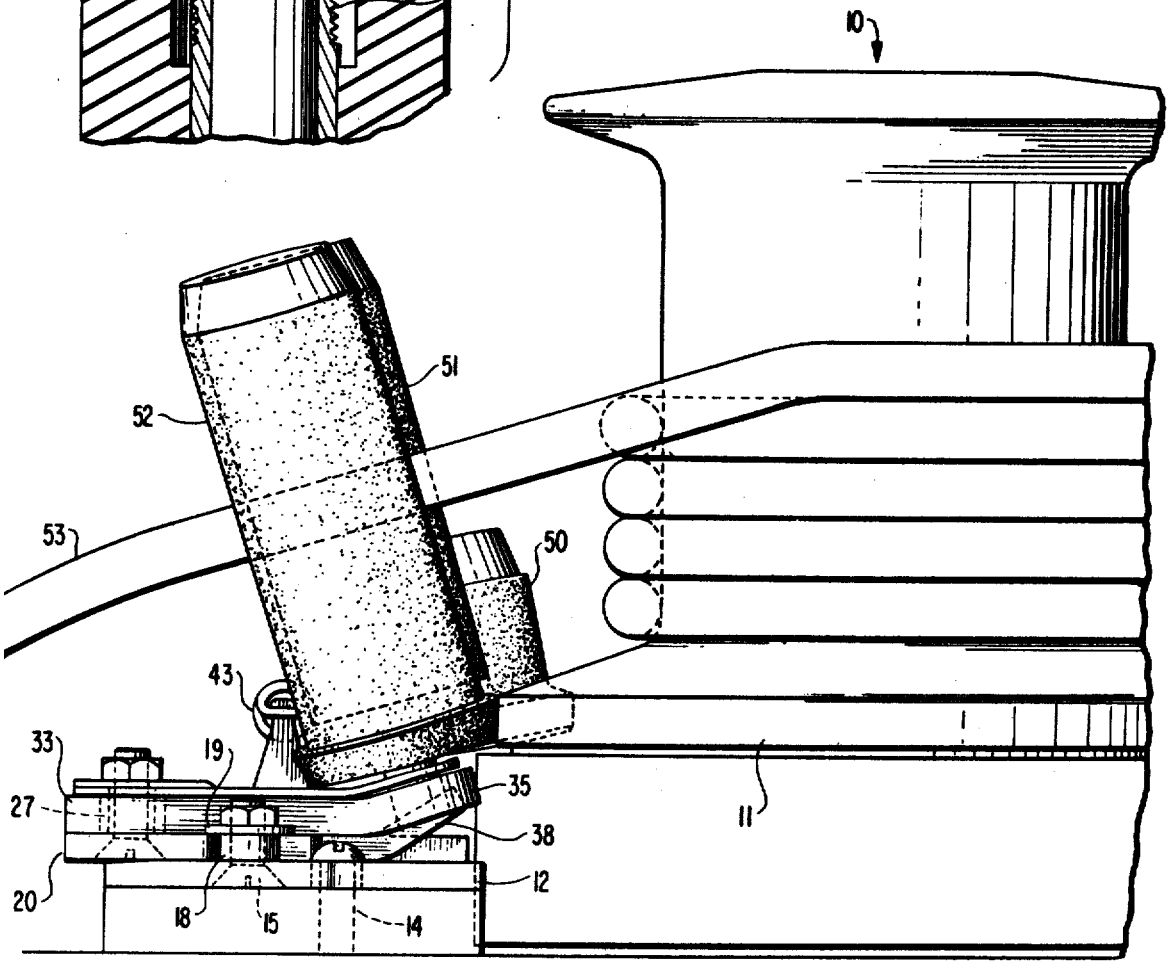

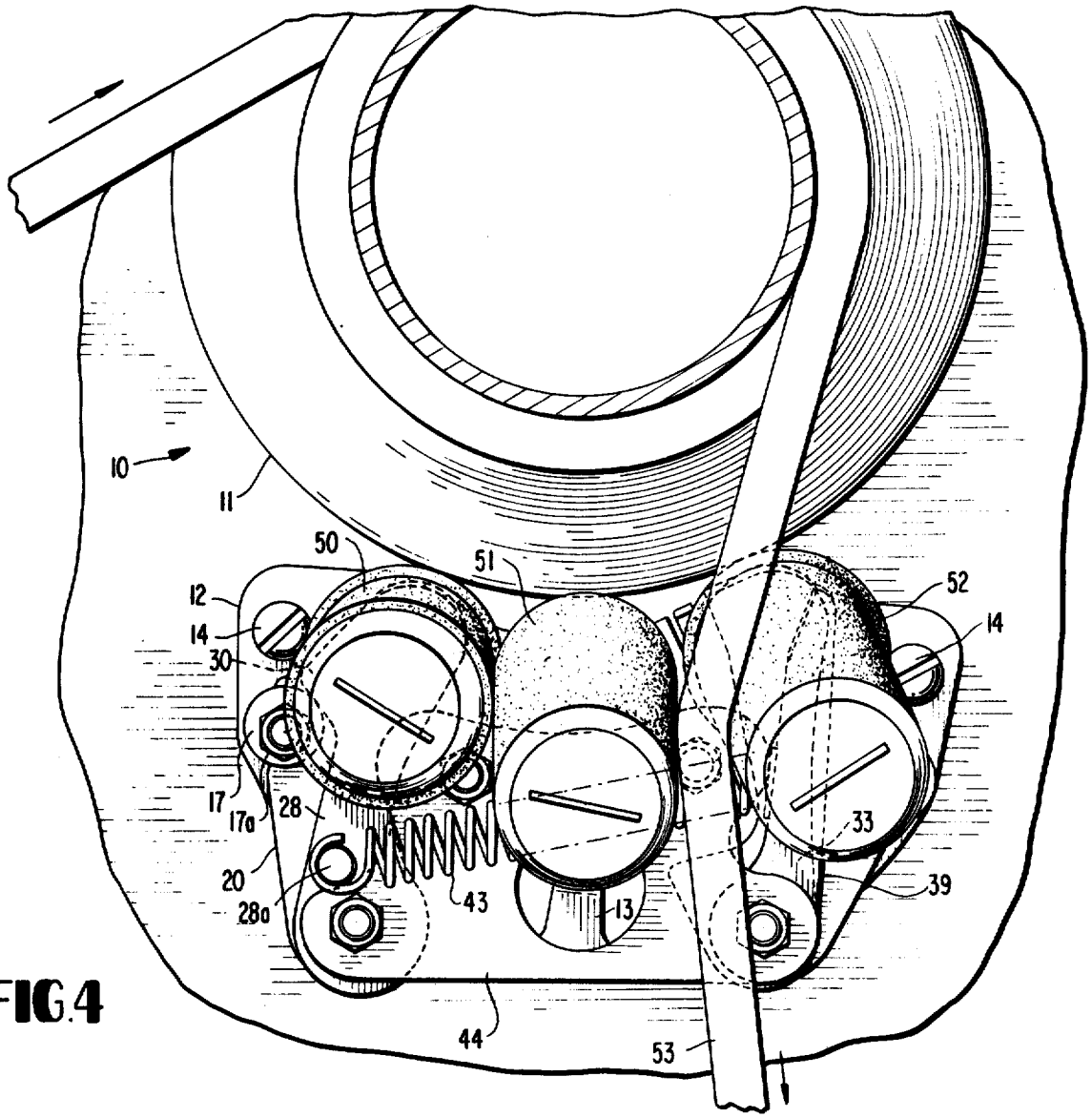
FIG.4
FIG.4A
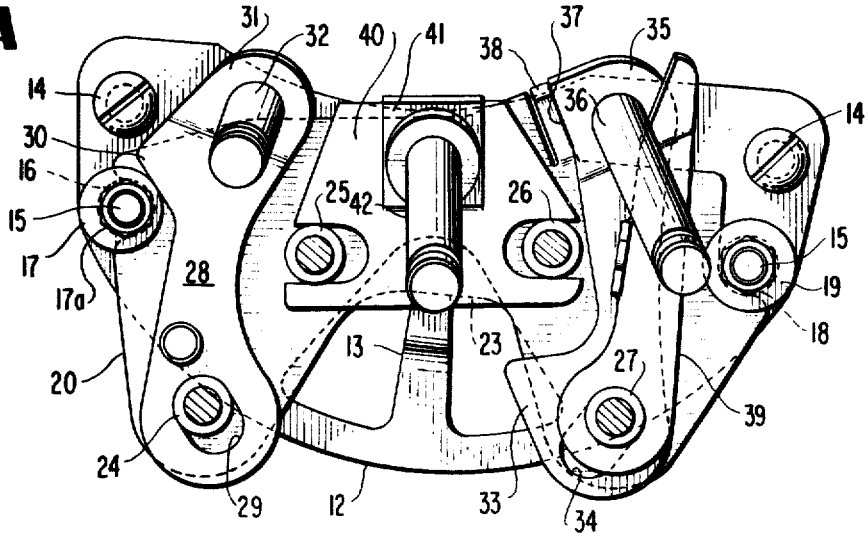

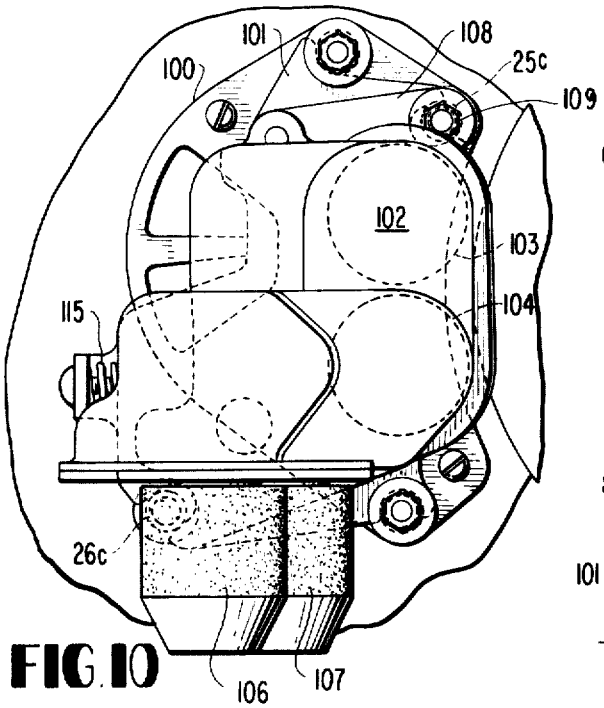
FIG. 10
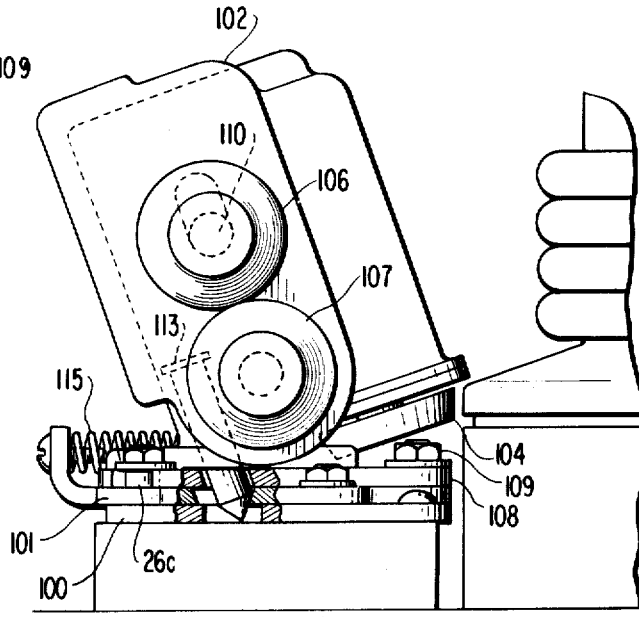
FIG. 11
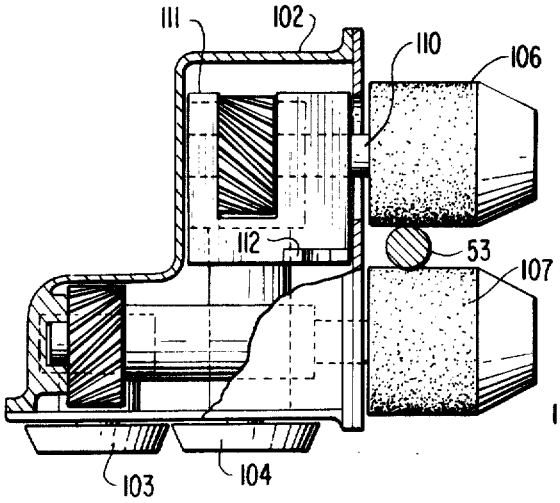
FIG. 12
FIG. 13
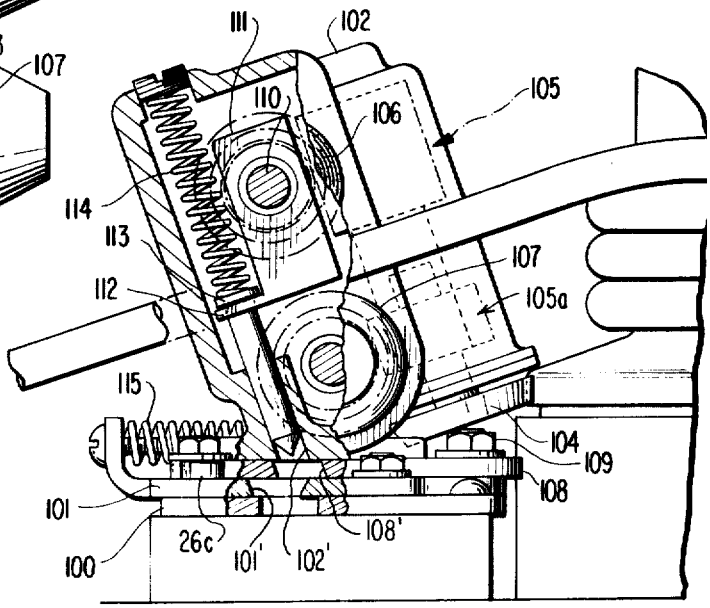

SELF-TAILING WINCH

Matter enclosed in heavy brackets [ ] appears in the original patent but forms no part of this reissue specification; matter printed in italics indicates the additions made by reissue.

FIELD OF INVENTION

The present invention relates to improvements in self-tailing winches and first disclosed by me in my earlier U.S. Pat. No. 3,841,606, granted Oct. 15, 1974.

The need for a self-tailing winch assembly was carefully narrated in my earlier patent and thus need not be expanded upon herein, however, suffice it to say that in the earlier patent there was not disclosed a quick release mechanism so that the self-tailing assembly could be removed from a support member and quickly attached to another support member for immediate use or taken off entirely to prevent theft or for servicing, such as lubricating, etc.

It is well-known that some of the larger sailing yachts have as many as ten to twenty-five winches.

Thus, the improvision of such a support on or mounted adjacent to move than one winch would provide means for one of the self-tailers to be quickly removed from a winch which is not being used to one where it is needed, thereby reducing the number of self-tailers required, but not the number of quick release supports.

Such an arrangement is not necessary, but is only proposed as a cost-saving factor, for it will be apparent that to those yachtsman where cost is not an important factor, the quick release support member referred to and discussed hereinafter in greater detail may be eliminated entirely, particularly where the self-tailing assembly is arranged to be associated with the winch drum per se.

BACKGROUND OF THE INVENTION

Within the last 30 years small winches for use on sail yachts have become popular. These winches generally comprise a winch drum which can turn in only clockwise direction having radial outwardly flaring ends defining therebetween a line-receiving portion about which several turns of line may be wrapped. One end of the line is connected to a sail or other item to be pulled, then several turns of the line are wrapped around the winch drum and then pulled in a crewman's hands away from the winch. A winch handle associated with the winch is actuated by the crew to rotate the winch and pull in the sail or other item.

In view of the fact such winches require the free section of the line to be pulled while at the same time the winch handle is cranked, the use of such winches requires two hands or even two crewmen, particularly where large forces are involved. (A force of 4,000 pounds is not uncommon.) In such latter case it is customary to have one crewman act as a "tailer" and another as the "wincher." For the cruising yactsman where but two people may handle a rather large sail yacht, the use of the aforementioned winches during strong winds presents serious difficulties because of the inability and/or danger involved in one person attempting to both tail the line as well as crank the winch.

Accordingly, a need has arisen for self-tailing winches for sail yachts. A few such winches have appeared on the market but to my knowledge they either require the threading of the line into around and out of them, or they are useful with only one size line or require the winch handle associated therewith to be removed and in any event existing winches cannot be economically adapted for selftailing use. As a consequence the yachtsman wishing to utilize the commercially available self-tailing winches must discard his existing winches and in view of the high cost of marine hardware this is extremely expensive.

In my earlier U.S. Pat. No. 3,841,606, the structure requires one hand to maintain pull on the line until the other hand has engaged the pinch roller. There also exists a need for a more simple to use and quick automatic threading self-tail device, for a self-tailing device which does not require the use of two hands and for a self-tailing device the use of which is not complicated by the presence of the winch crank on the winch.

SUMMARY OF THE INVENTION

Accordingly, to fill these needs I propose a self-tailing winch assembly and apparatus which utilizes conventional winches thereby permitting the yachtsman to to convert his existing winches to the self-tailing variety. In addition, the winch manufacturer by utilizing the teachings disclosed herein may offer a self-tailing winch assembly which consists of the manufacturer's present winch design, together with the additional accessory to render it self-tailing. He may also modify his winch design so as to substitute a gear drive for a friction drive contemplated as a part of this invention. In accordance with my invention I provide one or more line-gripping and pulling rollers which are supported adjacent the winch drum lower flange. These line-gripping and pulling rollers are sufficiently remote from the line receiving portion of the winch so that the crew may quickly and as heretofore wrap several turns of line around the winch drum. When the hand held section of the line which has been wrapped as heretofore around the winch drum is engaged with the line-gripping and pulling roller or rollers, depending on the embodiment, spring biasing means incorporated in the mechanism is actuated to maintain a pinch force on the line. The invention permits the yachtsman to utilize a variety of line sizes at different times on the winch and all the line sizes will be gripped and pulled. The line-gripping force, and related spring biasing and elements engaging the lower flange of the winch drum make rotation of the line-gripping rollers dependent on the winch drum rotation. When the winch is rotated, the rotation of the line-gripping and pulling rollers due to the relative diameters in engagement have greater surface speed than the line movement creating a pull on the line. The pull on the line in turn can be employed to increase the force of engagement at the winch drum flange making a friction contact drive practical, although a positive tooth type roller drive or V belt relative to the winch drum flange would have further merit should winches be provided with suitable drive mechanisms as I explain later herein.

The pinch and pull on the line by line-gripping and pulling rollers caused by having forced the line into engagement with one hand eliminates the need for a crewman to continue to pull on or cleat the line and the winch has been made self-tailing.

When easing out line or casting off the line from the winch, the line is manually pulled out of engagement and the line is handled in the usual manner. Spring biasing can be used to cause elements which engage the flange of the winch drum to retract from it when the line is jerked out of engagement.

FIGURE DESCRIPTIONS

FIG. 1 is a fragmentary side view of a sail yacht showing one of the embodiments of my new improved self-tailing winch assembly;

FIG. 3 shows schematically and generally in limited cross-section a manner of sealing the upstanding rollers which are not shaft driven;

FIG. 4 is a top plan view of the first embodiment of my improved self-tailing winch assembly mounted adjacent to a winch drum;

Figure 2:
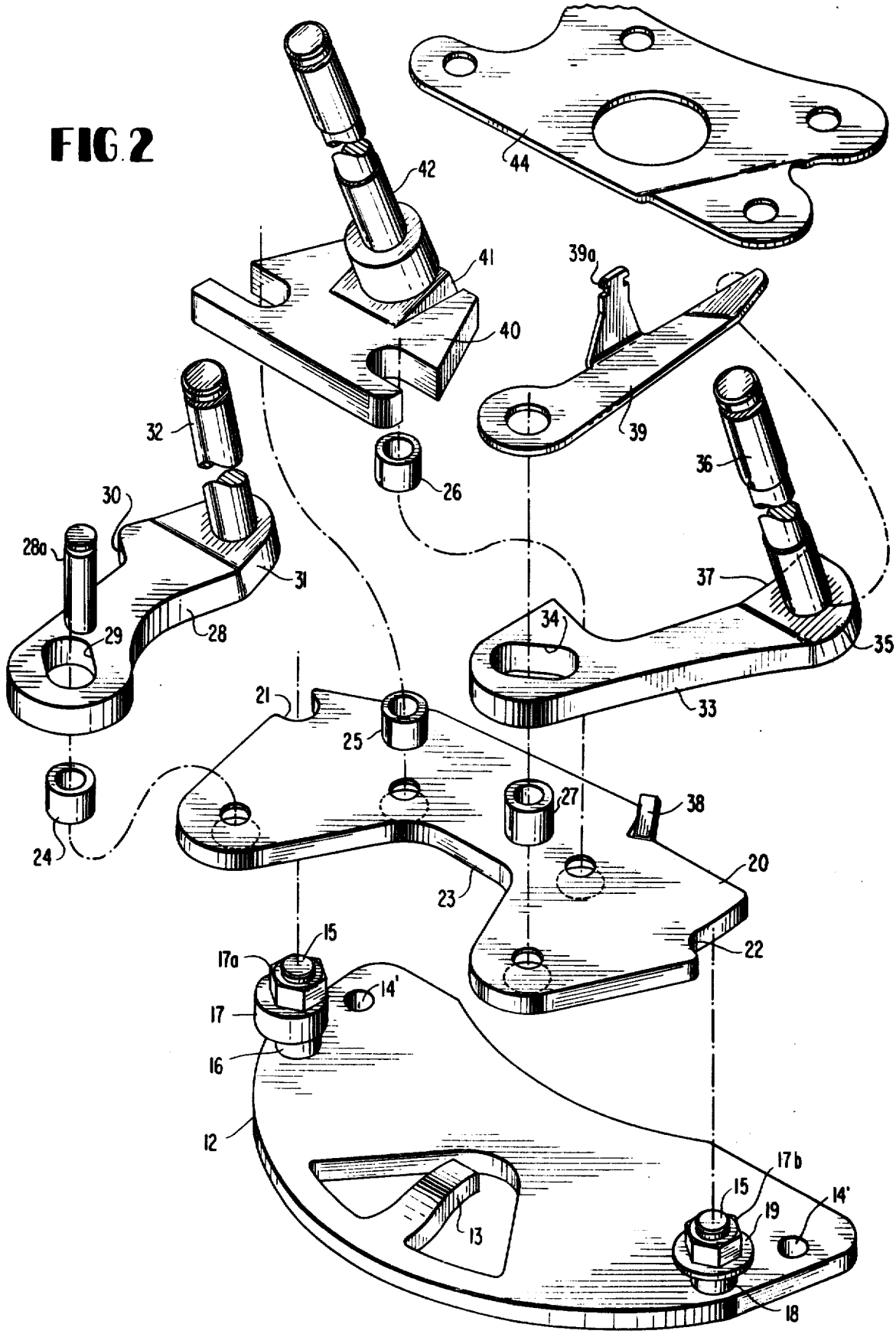
FIG. 2 shows an exploded view of the first embodiment of my improved self-tailing winch assembly.
Figure 6:
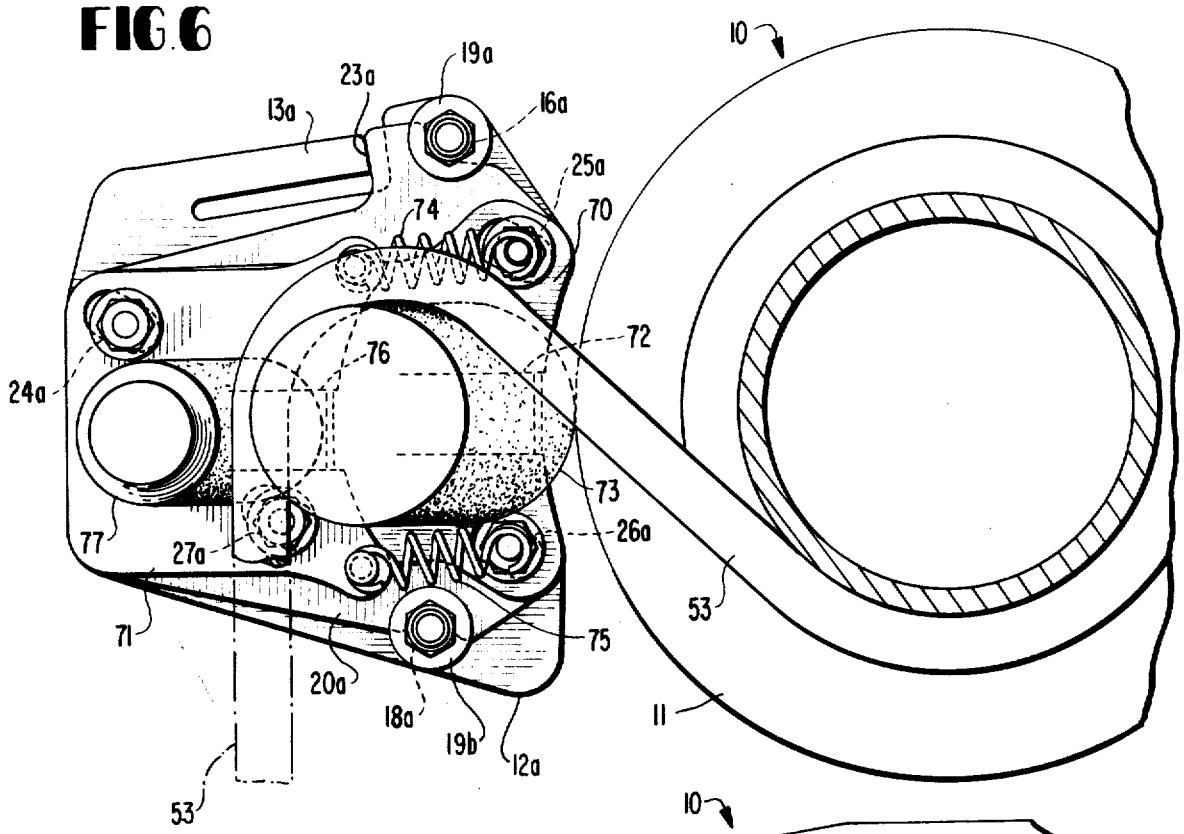
Figure 7:
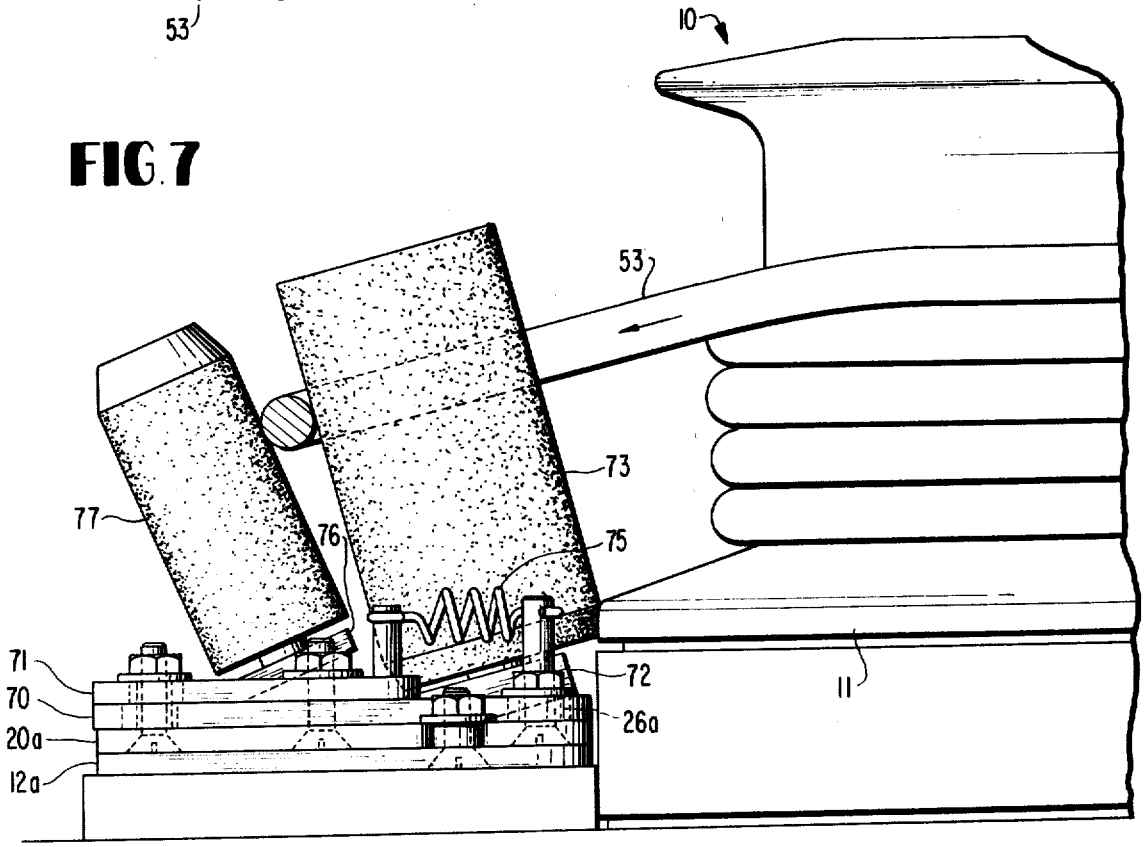
Figure 8:
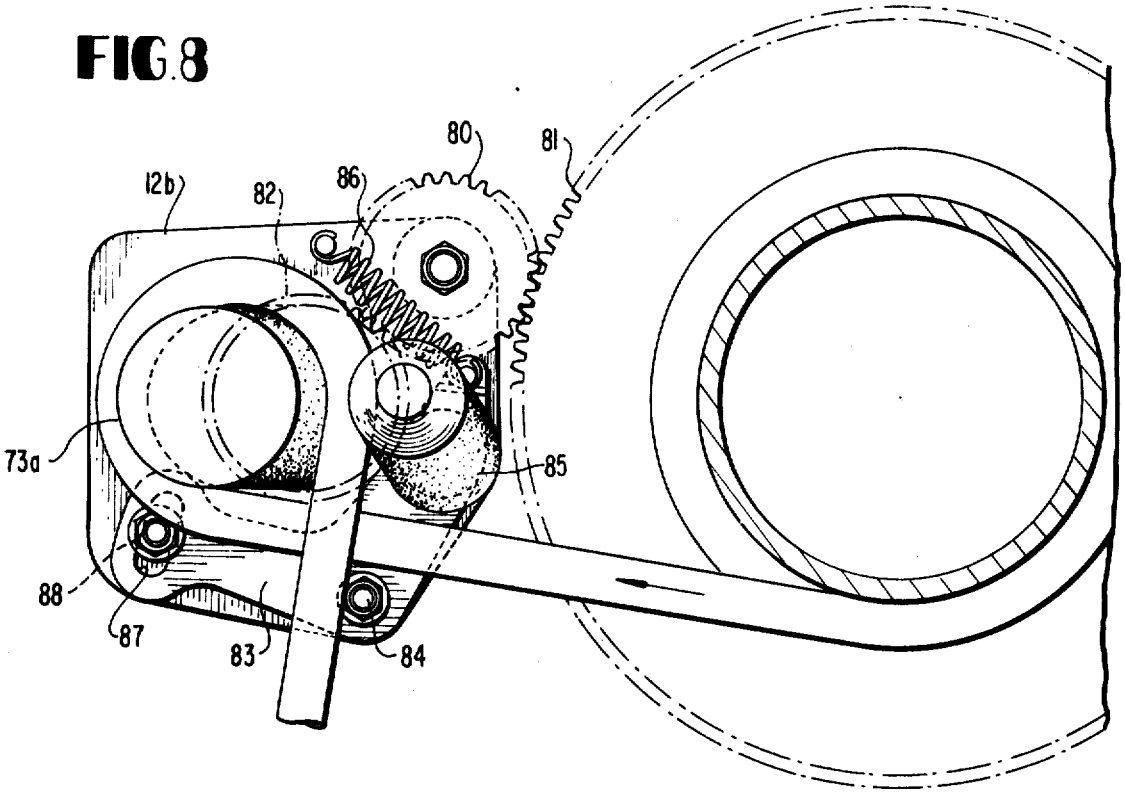
Figure 9:
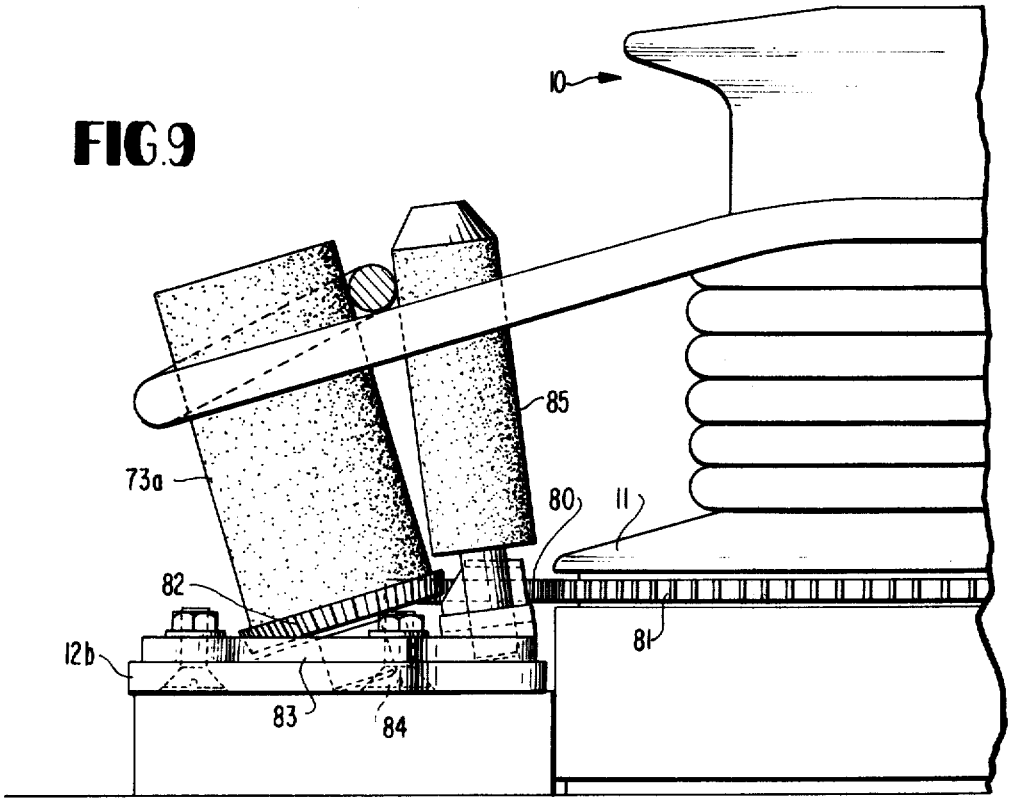
Figure 14:
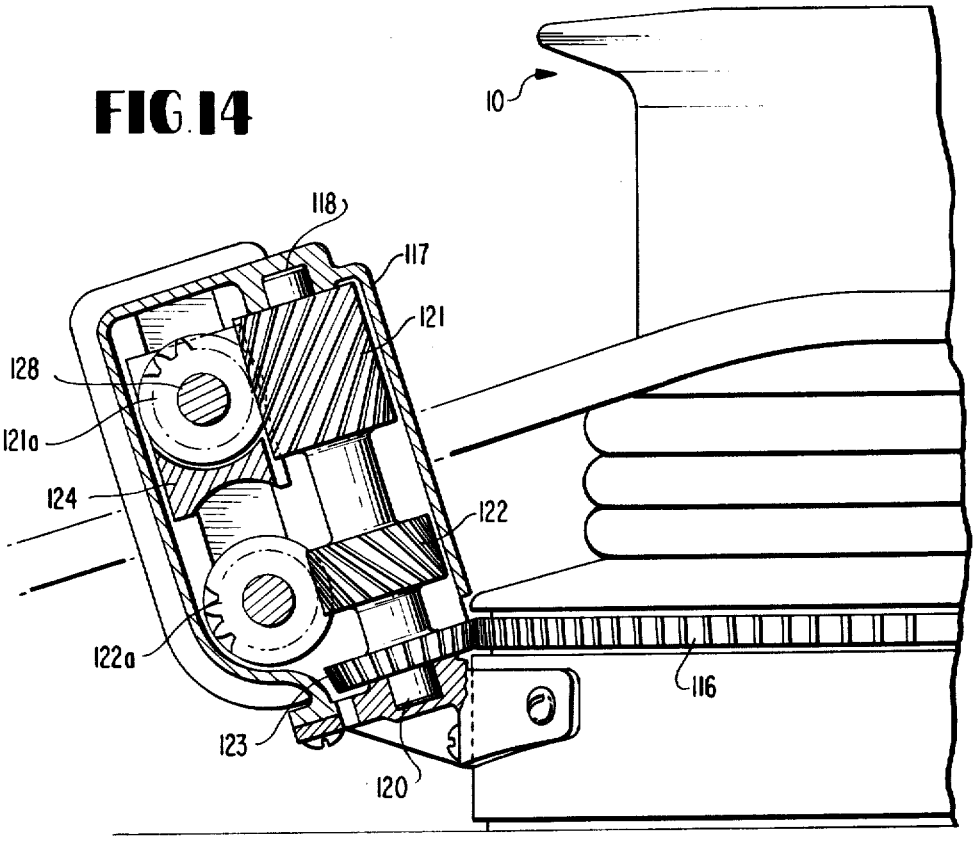
Figure 15:
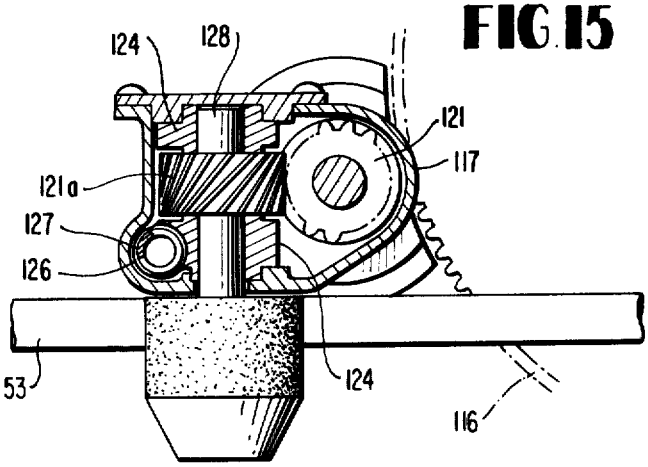

FIG. 4 A is a showing of the elements shown in the exploded view of FIG. 2 in assembled relation;

FIG. 5 is a side elevational view of the structure shown in FIG. 4;

FIG. 6 is a top plan view of a further embodiment of a self-tailing winch assembly;

FIG. 7 is a side elevational view of the invention shown in FIG. 6;

FIG. 8 shows a top plan view of a still further embodiment of my improvements in self-tailing winches;

FIG. 9 is a side elevational view of the structure shown in FIG. 8;

FIG. 10 is a top plan view of still another embodiment of my improvements in self-tailing winches;

FIG. 11 is a side elevational view of the structure shown in FIG. 10;

FIG. 12 is a fragmentary view of the interior of the housing 102 of FIG. 10 showing the helical gear drive;

FIG. 13 is a fragmentary side elevational view of the structure shown in FIG. 11 showing the interior line engaged position of elements of my improvements in self-tailing winches which includes a helical gear drive;

FIG. 14 is a fragmentary side elevational view of a still further embodiment of my improvements in self-tailing winches in which a helical gear train is in positive drive relation with a gear associated with the winch drum;

FIG. 15 is a fragmentary top plan of the structure shown in FIG. 14; and

Figure 16:
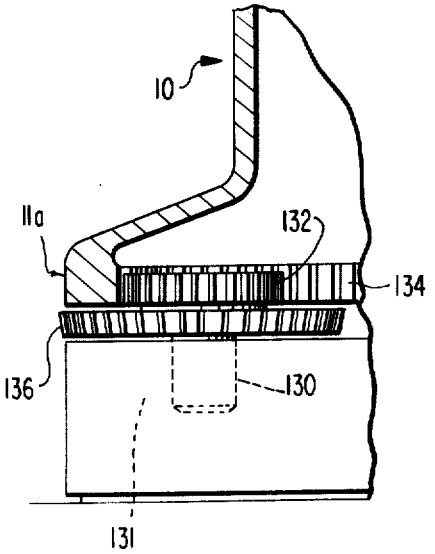
Figure 17:
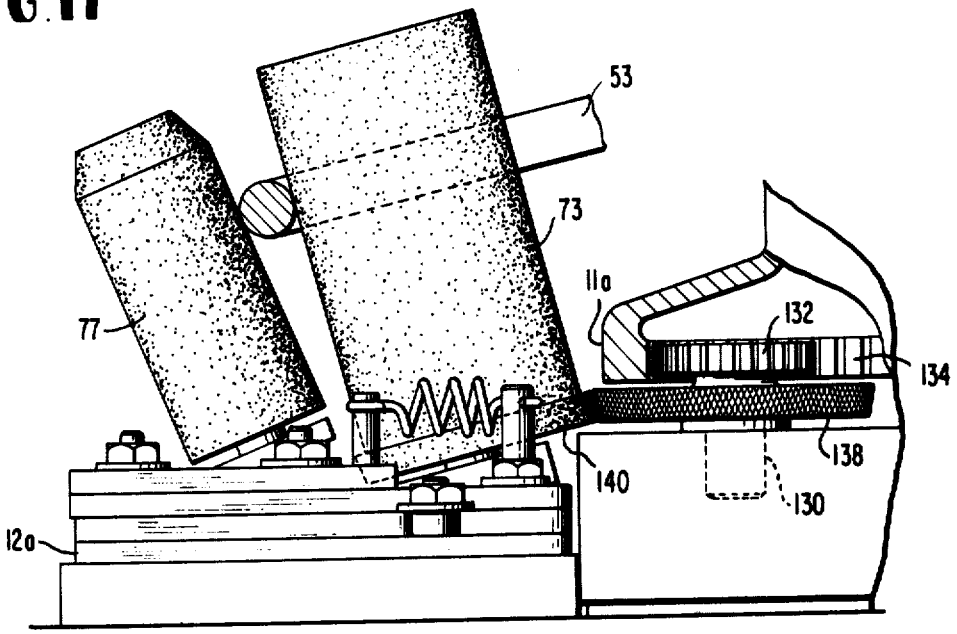
Figure 18:
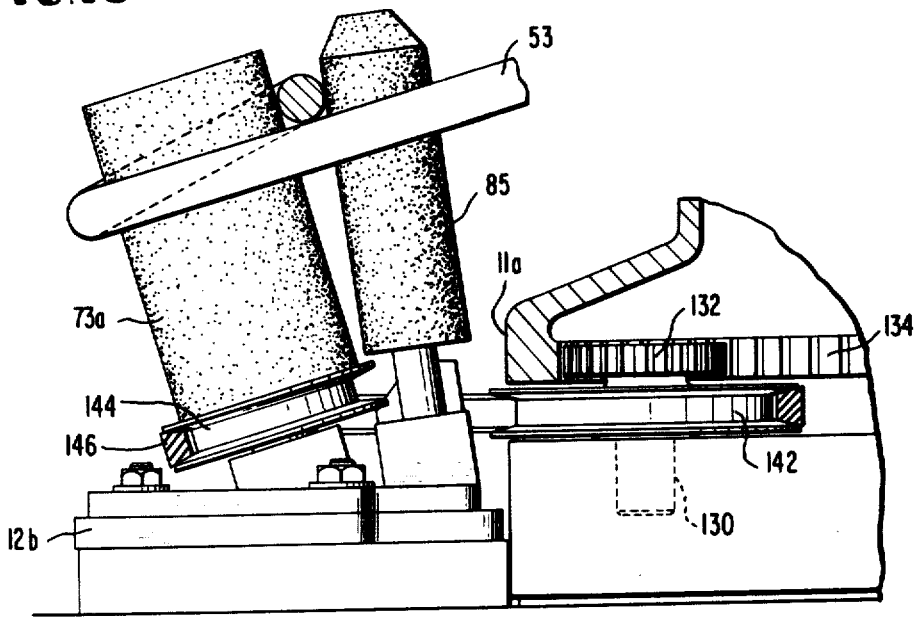

FIG. 16 is another fragmentary view of portion of the interior of a winch drum showing a drive gear system;

FIG. 17 is another fragmentary view of a portion of the interior of a winch drum showing a drive roller system;

FIG. 18 is another fragmentary view of a portion of the interior of a winch drum showing a drive pulley system.

DETAILED DESCRIPTION OF THE PREFERRED EMBODIMENT

Turning now to the drawings, reference will be made first to the view in FIG. 4 which shows a top plan view of one of my improvements in self-tailing winch assemblies in operative relation with a winch drum and grasping line 53.

In this view of my self-tailing mechanism is arranged to cooperate with the lower flange 11 of the winch drum 10, having an open, unobstructed upper end. Reference is now made to the exploded view in FIG. 2 for a better understanding of the assembled elements of FIG. 4 and there is shown a sub-support plate member 12 which is suitably apertured at 14'—14' to be fastened adjacent to a winch.

It will be noted that the sub-support plate member includes an angularly disposed upstruck depressible finger element 13 the purpose of which will be understood as the description progresses. It is to be understood that the sub-support plate member can be integrated with the winch base or attached to the winch base mounting surface, as is shown and described hereinafter.

Further, the sub-support plate member 12 includes oppositely disposed upstanding members one of which is provided with a pilot bushing 16 and an eccentric element 17 held by a nut 17a while the other upstanding member includes a pilot bushing 18, a washer 19 and nut 17b for positively fastening the washer and eccentric element at a predetermined spaced elevation above the sub-support plate member 12.

The numeral 20 depicts a removable support plate member which is provided with one notched edge area 21 arranged to engage the pilot bushing under the eccentric 17 and the opposite edge area 22 is arranged to be positioned under the washer 19 and held securely as the upstruck depressible finger 13 snaps upwardly into engagement with the reduced edge 23 of the removable support plate member.

It is also believed to be clear from this exploded view of FIG. 2 that the removable support plate member is arranged to support a plurality of upstanding bushing members 24–27 for a purpose that will now be described.

Looking now into the exploded view in the drawing, it will be noted that the left carrier member 28 for the secondary drive roller (to be shown later) includes an aperture 29 of slight elongate design for a purpose that will become apparent, said aperture being positioned over a bushing 24 and thereby arranged for pivotal and slidable movement about bushing 24.

The left carrier member has an offstanding nose with a wall portion 30 that is arranged to cooperate with the adjustable eccentric 17, which is fastened on the sub-support plate and would be on the removable support 20 if the sub-support were eliminated, the function of which will be better understood later, said carrier further including an angularly upstanding terminal wall 31 that is apertured and arranged to securely receive the roller shaft 32.

The right carrier member 33, also shown in this view, is also slotted at 34 and adapted to be supported on the bushing member 27 for relative pivotal and slidable movement about the bushing 27 with the terminal end portion 35 of said carrier member 33 being bent upwardly and including an apertured area into which a roller shaft 36 is securely fastened.

The angular terminal edge portion includes a wall 37 adapted to abut the tang 38 which is struck up from the removable support plate member 20 and its function and purpose will now be described.

At 39 there is shown a spring loaded pivotal finger, the up-turned terminal edge portion of which abuts the base of the roller shaft 36 which projects upwardly from the carrier member 33. The spring 43, best shown in FIG. 4, maintains this engaged condition of these elements at all times.

With further reference to the detail of the removable support plate member 20 shown in FIG. 2, there is interposed between the left and right carrier members a further carrier member 40 the front end of which is provided with an integral tab member 41 that is bent upwardly and forms a support for a further roller shaft 42 and its side walls provided with opposite extending notches adapted to straddle and move laterally on left and right bushings 25 and 26 respectively.

At 44 there is shown a cover plate provided with suitable apertures that are complemental to the bushings 24–27 said cover arranged to be held fast at a predetermined spaced elevation above the support plate 20 over the bushings by means of the threaded elements extending upwardly through the removable support plate member 20, through the bushings and through the cover plate.

Reference is made at this time to FIG. 3 where there is shown in a schematic exploded view of the upper portion of one of the roller shafts, this construction being typical of the assembly of all of the roller shafts, (but not of shaft driven rollers in some embodiments) each including a head portion 45 spaced from the upper end of the roller shaft and thereby arranged to receive a segment washer 46—46 is positioned in the slot 47 to retain the roller and metal sleeve assembly. As shown, the upper end of the hub is threaded at 48 and adapted to receive the threaded cap 49 after the elements are properly lubricated. The rollers are preferably of suitable rubber or other material having a highly frictional surface.

Turning back again to the top plan view of FIG. 4 it will be observed that the self-tailing winch assembly has been mounted adjacent to the bottom flange 11 of the winch drum 10 at which time the series of rollers 50, 51, 52 are adjacent to but their bottom extremities are not actually in contact with the flange 11. At this time the self-tailing winch assembly is ready for operation.

Reference is now made to the view in FIG. 5 where it will be noted that the line 53 which has several turns wound around the winch drum 10 is then brought away from the winch drum and a section thereof caused to be forced down into the V-gap provided by the rollers 51 and 52 which function as friction driven "line-gripping and pulling rollers" and will be so denoted hereinafter. At this time rollers 51 and 52 are moved apart by reason of the movable carrier members previously described (see FIG. 2) and at this time the bias of spring 43 is caused to yield and maintain a "pinch" on the line 53. Further, the elongate slot in the right carrier arm 33 causes roller 52 to move firmly against the winch drum flange 11 and also causes roller 51 to move on its carrier member by way of the slots and bushings previously mentioned to the left thereby applying the line pinching force against the conical perimeter of the secondary drive roller 50. It is to be understood that the force applied against the secondary drive roller 50 tranfers to the abutting portion 30 of its carrier member against the eccentric bushing and in conjunction with the slot and bushing in the left carrier advances the secondary drive roller 50 to bear firmly against the winch drum flange 11.

It is now believed to be apparent to those skilled in the art that the line 53 cannot now run off the winch drum in a reverse direction, for should the line 53 begin to slip on the winch drum in the reverse direction roller 52 will be further urged through the design of its carrier member (explained earlier herein) to more tightly engage the winch drum flange 11 at its drive portion and since roller 52 is trying to rotate in a reverse direction it will move to the left which further increases the pinch force on the line 53 as previously described and roller 51 and 50 are further forced to the left and caused to bear more firmly on the elements previously described in a self-energizing manner.

It is also to be understood that as the winch drive is rotated by normal means with the line in between the line-gripping and pulling rollers, as described, the relative diameters of said rollers are caused to travel at a greater surface speed than the line on the drum, thereby providing a "pull" on the line 53.

Again the pull on the line 53 also causes roller 52 to be forced to bear more forcefully against the flange 11 of the winch drum. This additional force of the frictional drive engagement and rotation of the winch drum and its flange increase the "pinching force" on the line in a self-energizing manner improving the efficiency beyond that furnished by the bias of spring 43 which is positioned between a post 28a on the left carrier member 28 and the upwardly bent tab 39a carried by the finger 39 and shown in FIG. 2.

In view of the earlier description it is believed that it will be obvious that as soon as the line 53 is hand pulled upwardly out from between the "line gripping and pulling rollers" 51 and 52 that the spring 43 will cause all of the carrier members to return to their original position.

It is also to be understood that the line-gripping and pulling rollers are disposed at an angle relative to the winch drums for adequate space to wrap several turns of the line about the drum with ease as well as relative to each other in order to accomodate lines of various diameters. Approximately the same number of turns of line of a larger diameter will consume a greater height on the winch drum than a line of smaller diameter, thus it will be appreciated that the smaller line will be accomodated deeper into the bight between the line-gripping and pulling rollers than the line of a greater diameter and the rollers will therefore pinch, grip and pull all of them.

In another embodiment of this invention illustrated in FIG. 6 is shown a sub-support plate member 12a of a different configuration but which performs the same function as the earlier described sub-support plate member 12.

As in the original sub-support plate member there is provided an upstruck depressible finger 13a and edge area 23a as well as pilot bushings 16a and 18a above each of which are provided washers 19a and 19b, respectively, which function to contain the removable support plate member 20a in position with the bushings and the washers and the sub-support plate.

As best shown in the views FIGS. 6 and 7, there are superimposed carrier members 70 and 71 respectively, the lowermost of which is positioned in juxtaposition with support member 20a which before assembly is provided with a series of pilot bushings 24a–27a and is thus adapted to receive the first and second carrier members 70 and 71, respectively.

The front wall of the lower carrier member is provided with an upstruck tongue 72 which is shown provided with a roller shaft (not shown) and on which is positioned a friction driven line-gripping and pulling roller 73.

The superimposed carrier 71 is formed with complemental slots adapted to receive the bushings 24a and 27a and slidable thereabout and suitable ears provided with upstanding posts to each pair of which are secured tension springs 74 and 75, that straddle the friction driven line-gripping and pulling roller 73, respectively.

It will also be noted that carrier member 70 includes complementally formed elongated openings which are adapted to be positioned over the bushings 25a and 26a respectively, and slidable thereabout, and that post extensions projecting above said bushings support one end of the pair of springs 74 and 75, respectively.

The superimposed carrier member 71 also is provided with an upstruck tongue 76 and adapted to receive a roller shaft (not shown) and on which is positioned a "pinch roller" 77, as explained earlier in connection with the first embodiment. Or a spring biased pinch finger (not shown) which allows the line to pass by can be used in place of the pinch rollers. When the line 53 is forced down into the gap between the pair of rollers as shown, the bias of the springs 74 and 75 apply a pinching force on the line between the rollers, this pinching force in turn causing the line-gripping and pulling roller 73 with its carrier member to move tightly against the flange 11 of the winch drum to be driven thereby.

As in the first embodiment, if the line tends to slip in a reverse direction on the winch drum or if the winch drum is rotated in the normal manner the pull of the line on roller 72 will increase the frictional engagement force against the winch drum flange and this embodiment is also self energizing.

In the embodiment of the invention shown in FIG. 8 there is shown a removable support plate member 12b which is suitably held on a fixed sub-support plate (not shown) but is of the type described in embodiment 1 and 2.

The removable support plate 12b as explained earlier relative to the other embodiments is provided with a offstanding tab to support a roller shaft (not shown) which in turn carries the line-gripping pulling roller 73a. This plate is further suitably provided with an intermediate rotatable gear 80 that cooperates with a ring gear 81 that is carried by the winch drum flange 11 or as in FIG. 16, cooperates with gear 136 that is carried adjacent to the winch drum flange 11a as well as the gear 82, FIG. 9, carried by the line-gripping and pulling roller 73a and is of such a configuration that it will accomodate a bell crank carrier 83 which is pivotal about axis 84 and is provided at one end with an upturned portion capable of receiving the roller shaft (not shown) and the pinch roller 85 supported thereby. In addition, the extremity of said upturned portion includes a means for attaching a tension spring 86 shown in FIG. 8, with the opposite end of the bell crank being slotted as at 87 and slidably arranged relative to a bushing 88 carried by the removable support plate 12b, and thus positively contained.

In view of the description of the foregoing embodiments it is believed that since the operation of this structure is more simplified than the others that it will be readily understood.

The first and second embodiments can also be altered to employ a gear drive in lieu of the friction drive described, all of which will be apparent to those skilled in the art.

As distinguished from the previous embodiments in all of which the line gripping-pulling rollers are vertically disposed in relation to the winch, reference is now made to still further embodiments where they are disposed horizontally.

In the concept shown in FIG. 10 the sub-support plate member 100, while different in configuration from the sub-supports described earlier, functions in exactly the same manner as in those previous embodiments and the removable support plate 101, while also different in configuration attaches in the same manner to the sub-support and in turn the removable support plate supports a pair of bushings 25c and 26c respectively, for the same purpose of containment and slidable travel as described in connection with the earlier embodiments of the invention.

The housing 102 is provided with a pair of protruding shafts (not shown) having friction drive rollers 103 and 104 which are arranged to drive through suitable helical gear trains 105 and 105a, FIG. 13, within the housing 102, the horizontally disposed line-gripping and pulling rollers 106 and 107 with the said housing being positioned on the slidable carrier plate 108 which is contained against inadvertent movement by the bushings 25c–26c and suitable washers and fasteners applied thereover, one of which is shown at 109. This method of slidable containment is the same as clearly described for previous embodiments.

In the cross-section views of FIG. 12 it is clearly shown that the upper line-gripping and pulling roller 106 is provided with a drive shaft 110 mounted in a slidable block 111 which is clearly shown in FIGS. 12 and 13 (and similarly in FIGS. 14 and 15). The shaft and gear are mounted within the block. The block is provided with a perforated tongue 112 which receives a headed pin 113 (see FIG. 13 and positioned above the head of the pin is a compression spring 114 which furnishes yieldable bias pinching force for the upper traveling line-gripping and pulling roller 106 when the line 53, which can be of a variety of diameters, is forced between the line-gripping and pulling rollers the terminal end of which are tapered for ease of entry of the line, also shown in the previous embodiments.

When no line is between the line-gripping and pulling rollers the thrust of the spring 114 against the head of the pin closes the gap between the line-gripping and pulling rollers and slides the pin downward through a guide hole 102' in the housing 102 and thence through the aperture 108' in the mounting plate 108 and the point on the pin comes in contact with a tapered hole 101' provided in base plate 101 and, in so penetrating, causes the slide 108, together with the housing 105, line-gripping and pulling rollers, and drive rollers, to move away from the winch drum thus withdrawing the friction drive rollers from contact with the winch drum flange, this position is shown in FIG. 11. As distinguished from this, when the line section 53 is forced between the line-gripping and pulling rollers the pin is retracted from its projected position and the spring 115 carried between the upturned end wall of plate 101 and the housing 102 causes the housing and its friction drive rollers 103 and 104 to advance into firm contact with the lower flange of the winch drum, as clearly shown in FIG. 13.

It can be seen that the pull on the line further engages the drive rollers 103 and 104 and the line gripping and pulling roller 106, since it is trying to turn in the wrong direction and is driven by a helical gear train, is caused to transmit the pull of the line into pinch force on the line, and this embodiment is therefore also self-energizing.

In a still further embodiment of this invention there is shown in FIG. 14 a simplified structure that is particularly adaptable to a winch assembly that has been modified by the manufacturer thereof to include a ring gear such as shown at 116 or in a similar preferred manner to gear 136 shown in FIG. 16.

In the invention shown in FIGS. 10–14 the line-gripping and pulling rollers are driven by a pair of friction drive rollers which protrude from the housing 102, however, in this embodiment there is disclosed a gear train assembly which is adaptable to a ring gear carried by the winch drum assembly and which it is proposed to have included in the winch drum structure when it is manufactured.

Further in the structure shown in FIG. 14, the housing 117 which is quite compact includes bearing recesses 118 and 120 at the upper and lower ends thereof and these are adapted to receive therebetween the spaced helical gears 121 and 122 which are comparable to the helical gear assembly shown in FIGS. 10–14 but which further includes a bevel gear 123 that cooperates with and can be driven by the ring gear 116 on the winch drum or by gear 136 in FIG. 16. The housing 117 may be fastened in any suitable manner to cooperate with the gear on the winch and as disclosed it is mounted on the base of the winch drum. Also, as in the embodiment of FIGS. 10–14, the housing 117 includes cooperating helical gears 121a and 122a, the upper helical gear 121a being adapted to limited slidable movement in a block carrier that is shown at 124 in FIGS. 14 and 15. This block carries a tongue 126 and the spring 127 is positioned between the top of the housing and the tongue in order to urge the block downwardly.

It will be clear from these drawings that the shaft 128 carrying the movable helical gear also carries the upper movable line-gripping and pulling roller, all of which is shown in FIG. 15.

Winch construction over the years has become standardized to such an extent that even the crank handles are interchangeable. Also, the modern winch drum has a relatively short lower flange inside of which is provided an internal ring gear, e.g., see the patent to Guangorena et al, U.S. Pat. No. 3,728,914, which is assigned to Barient Company of San Carlos, Calif.

In FIG. 16 there is schematically shown a typical winch drum 10 with a flange 11 which has provided internally thereof an integral ring gear 134 which is arranged to cooperate with drivable gears to rotate the winch drum with pawls (not shown) being utilized to prevent reverse rotation of the winch drum.

It is in such a winch drum construction as that shown in FIG. 16 that it is contemplated to suitably support a vertical shaft 130 in the base 131, with the upper extremity of the shaft including a small gear 132 arranged to be driven by the internal gear 134 and therethrough adapted to drive gear 136 and in turn drive the gear system contemplated by this disclosure and all of which will be well understood by making reference to FIGS. 8, 9 and 14.

It is also to be understood that gear 136 can be driven in either of two directions if the intermediate gear is provided therefore and is arranged to protrude from beneath the flange 11 of the winch drum in order to be junctioned with any of the various embodiments of the self-tailing winch assembly that include a gear train as explained above.

Furthermore, as distinguished from the construction shown in FIG. 16 where the shaft 130 carries gear 132 which is arranged to be driven by the internal gear 134, a knurled wheel 138, as in FIG. 17, can be substituted for drive gear 136, said knurled wheel cooperating with the integral shoulder 140 of roller 73 to drive the same as explained earlier herein.

In FIG. 18 the construction is shown as having been further modified to adapt the base or roller 73a for the reception of a sheave 144 which is belt driven by a sheave 142 carried by the shaft 130.

Winches have always been designed to haul lines under heavy loads and the top and bottom flanges were used to contain the line on the line receiving portion. In the advancement of sailboat winch designs the lower flange below the line receiving portion was enlarged, particularly in diameter and provided with an internal ring gear in the flange to increase power with internal spur gear systems. A typical modern winch, GUANGORENA U.S. Pat. No. 3,728,914, and all its predecessors that I have uncovered and used in sailing since 1931 were designed with no apparent other use in mind for the flanges.

As noted earlier herein, it is within the contemplation of this invention that all embodiments disclosed can be made to junction with either a friction drive or a gear drive, all of which has been clearly illustrated and described.

It will be understood that various changes in the details, materials, and arrangements of parts which have been described and illustrated in order to explain the nature of the invention may be made by those skilled in the art within the principle and scope of the invention as expressed in the following claims.

Furthermore, for convenience in illustration and particularly in view of the inventor's lengthy experience with sailboats, the descriptive material and drawings have been correlated therewith, however, this is not to be considered as restrictive but merely representative of one of many applications for winches and for other purposes.

What is claimed is:

1. A self-tailing sailboat winch assembly comprising in combination:

a capstan type winch having an open end,

*said capstan type winch together having* a rotative drum about which turns of a section of a rope are manually applied and thereafter require[:

pull continuously] *continuous pull of said rope* to maintain traction of said turns with [the] *a* rope receiving surface of said drum and while said drum is rotated, *and* pull *of said rope* while removing and pushing away the rope which exits said drum,

[a conventional tailing procedure and optionally, said tailing is performed by said winch by engaging a section of said rope between elements of self-tailing means provided therefore in combination with said winch comprising:]

*elements means which provides self-tailing of said rope off of said winch comprising,* at least one offstanding roller driven by said winch to rotate with said drum,

[an included] pinch-finger means *to pinch a section of rope* having spring biasing means *to bias said pinch-finger means,* said pinch-finger means [can be a pinch-roller, said pinch-roller may also be driven by said winch to rotate with said winch drum,] cooperating with said at least one offstanding roller driven by said winch to pinch a section of said rope *therebetween, and* retain and pull said rope exiting said winch [drum] and push it away while said drum is rotated, carrier means [for] *supporting* said *at least one* offstanding roller and said pinch-finger means, [include carriers thereof that are caused by said pull on said rope to move relative to said rope to apply additional pinch force on said rope in a self-energizing manner,] *and including carriers* said carriers are [, optionally,] caused by said pull [on] *of* said rope to move toward said winch to engage drive means to power said at least one offstanding roller and *said carriers* retract therefrom by *said* spring biasing means when said rope is disengaged from said self-tailing elements.

said drive means, which may consist of [obvious] rotative drive trains for coupling [the] *a* drive of said winch to said at least one offstanding roller, *and* includes the use of the flange of said drum adjacent the base of said winch and rotative elements coupled to said flange used to drive said *at least one* offstanding roller, support means for retaining and constraining movement of said carrier means for said at least one offstanding roller and said carrier means for said pinch-finger means, *and* said spring biasing means[, the portion of said drive means for said at least one offstanding roller which engages the remaining portion of said drive means,]

sub-support means [an off-center extension of the base of said winch, fixed to the base support of said winch drum, adapted to sub-support, in a manner] providing for quick removal and quick attachment, of [said support means] all *above mentioned* elements assembled to said support *means.* [included,]

[said base support includes support means for said remaining portion of said drive means for said at least one roller, said support means may be adapted to be mounted to said winch without said sub-support.]

2. Apparatus for rendering a sailboat winch selftailing comprising:

at least one offstanding roller having a drive train arranged to engage and be driven by an end flange of a sailboat winch drum *which is* adjacent the supporting base of said sailboat winch drum, [to rotate] *and which said at least one offstanding roller rotates* with said [drum] *sailboat winch,*

[an included] pinch-finger means *to pinch a section of rope and* having spring biasing means, *to bias said pinch-finger means,* said pinch-finger means [can be a pinch-roller, said pinch-roller may also be driven by said end flange to rotate with said winch drum,] cooperating with said at least one offstanding roller to pinch and retain a section of [a] *said* rope *therebetween* and pull said rope exiting said winch [drum] and push it away while said [winch] drum is rotated, carrier means [for] *supporting* said *at least one* offstanding roller and said pinch-finger means [include] *and including* carriers [thereof that are caused to move by said pull on said rope to apply additional pinch force on said rope in a self-energizing manner], said carriers are [optionally] caused by said pull [on] *of* said rope to move toward the winch to engage drive means to power said at least one offstanding roller and *said carriers* retract therefrom when said rope is disengaged from between said *at least one* offstanding roller and said [included] pinch-finger means,

*said* means may consist of various drive trains [obvious] for coupling the drive of said *at least one* offstanding roller to [a] *the* winch and includes the use of the end flange of the winch drum adjacent the base of a winch and rotative drive elements coupled to said *end* flange used to drive said at least one offstanding roller, support means for[:]

retaining and constraining movement of said carriers of said at least one offstanding roller and said [included] pinch-finger means, *and said* spring biasing means, [that portion of said drive means which engages a winch drum flange portion of said drive means,]

sub-support means adapted to be mounted adjacent [a] *the* winch and further adapted to sub-support, in a manner providing for quick removal and quick attachment, said support means, *and* all elements assembled to said support *means.* [included, said support means may be adapted to be mounted adjacent a winch, without said sub-support.]

*3. A self-tailing winch assembly, comprising:*

*at least one drum mounted for rotation about a fixed axis extending from a base, said drum having an open unobstructed end, a flange adjacent said base, and a line-receiving portion disposed between said flange and said open end,*

*support means mounted adjacent said drum for supporting said winch assembly,*

*line grasping means to engage a line mounted on said support means and disposed in spaced-apart relation to said drum, said line grasping means including first and second grasping assemblies, said first grasping assembly including at least one roller,*

*said support means further including a carrier assembly moveably mounting said second grasping assembly,*

*drive means including means for drivingly interconnecting said flange and said one roller,*

*said carrier assembly further including biasing means operably engaging at least one of said grasping assemblies and normally biasing said one roller and said second grasping assembly into closer relationship with one another to releasibly grip said line extending therebetween from the drum whereby the line so gripped is drawn away from the drum upon rotation of the drum.*

*4. A self-tailing winch assembly as in claim 3 wherein said second grasping assembly comprises at least one pinch finger.*

*5. A self-tailing winch assembly as in claim 3 wherein said second grasping assembly comprises at least one pinch roller, said pinch roller being rotatably mounted on said carrier assembly and normally biased toward said one roller to grasp a line therebetween.*

*6. A self-tailing winch assembly as in claim 5 wherein said one pinch roller is caused to rotate concurrently with said one roller as the line passes therebetween and in contact with both.*

*7. A self-tailing winch assembly as in claim 5 wherein said drive means includes means drivingly connecting said one pinch roller and said flange.*

*8. The self-tailing winch assembly as in claim 3 wherein said first grasping assembly further comprises another carrier assembly mounting said one roller for movement into and out of driving relation with said flange.*

*9. The self-tailing winch assembly as in claim 8 further comprising means for moving said one roller into driving engagement with said flange when said line is gripped between said one roller and said second grasping assembly and out of such engagement when the line is removed therefrom.*

*10. The self-tailing winch assembly as in claim 8 wherein said second grasping assembly comprises at least one pinch roller, said pinch roller being rotatably mounted on said carrier assembly and normally biased toward said one roller to grasp a line therebetween.*

*11. The self-tailing winch assembly as in claim 10 wherein said second grasping assembly further comprises another carrier assembly mounting said pinch roller for movement into and out of driving engagement with said flange.*

*12. The self-tailing winch assembly as in claim 11 further comprising means for moving said another carrier assembly of said second grasping assembly, which moves said pinch roller into driving relation with said flange in response to engagement and disengagement of said line between said first and second grasping assemblies.*

*13. An accessory for use with a winch of the type having at least one drum mounted for rotation about a fixed axis extending from a base, said drum having an open unobstructed end, a flange adjacent said base, and a line-receiving portion disposed between said flange and said open end, the accessory comprising,*

*support means mounted adjacent said drum for supporting said accessory,*

*line grasping means to engage a line mounted on said support means and disposed in spaced-apart relation to said drum, said line grasping means including first and second grasping assemblies, said first grasping assembly including at least one roller,*

*said support means further including a carrier assembly moveably mounting said second grasping assembly,*

*drive means including means for drivingly interconnecting the flange on the winch and said one roller,*

*said carrier assembly further including biasing means operably engaging at least one of said grasping assemblies and normally biasing said one roller and said second grasping assembly into closer relationship with one another to releasibly grip said line extending therebetween from the drum whereby said line so gripped is drawn away from the drum upon rotation of the drum.*

*14. The accessory as in claim 13 wherein said second grasping assembly comprises at least one pinch finger.*

*15. The accessory as in claim 13 wherein said second grasping assembly comprises at least one pinch roller, said pinch roller being rotatably mounted on said carrier assembly and normally biased toward said one roller to grasp a line therebetween.*

*16. The accessory as in claim 15 wherein said one pinch roller is caused to rotate concurrently with said one roller as the line passes therebetween and in contact with both.*

*17. The accessory as in claim 15 wherein said drive means includes means drivingly connecting said one pinch roller and the flange on the winch.*

*18. The accessory as in claim 16 wherein said first grasping assembly further comprises another carrier assembly mounting said one roller for movement into and out of driving relation with the flange on the winch.*

*19. The accessory as in claim 18 further comprising means for moving said one roller into driving engagement with said flange when said line is gripped between said one roller and said second grasping assembly and out of such engagement when the line is removed therefrom.*

*20. The accessory as in claim 18 wherein said second grasping assembly comprises at least one pinch roller, said pinch roller being rotatably mounted on said carrier assembly and normally biased toward said one roller to grasp a line therebetween.*

*21. The accessory as in claim 20 wherein said second grasping assembly comprises another carrier assembly further mounting said pinch roller for movement into and out of driving engagement with said flange.*

*22. The accessory as in claim 21 further comprising means for moving said another carrier assembly of said second grasping assembly, which moves said pinch roller into and out of driving relation with said flange.*

* * * * *